United States Patent
Chen et al.

(10) Patent No.: US 8,385,009 B2
(45) Date of Patent: Feb. 26, 2013

(54) SCANNER LENS

(75) Inventors: Chun-Hong Chen, Taichung (TW); Jian-Wei Lee, Taiachung (TW)

(73) Assignee: Asia Optical International Ltd., Tortola (VG)

( * ) Notice: Subject to any disclaimer, the term of this patent is extended or adjusted under 35 U.S.C. 154(b) by 88 days.

(21) Appl. No.: 12/878,459

(22) Filed: Sep. 9, 2010

(65) Prior Publication Data

US 2011/0058259 A1 Mar. 10, 2011

(30) Foreign Application Priority Data

Sep. 9, 2009 (TW) ................................ 98130376 A

(51) Int. Cl.
*G02B 9/14* (2006.01)

(52) U.S. Cl. ....................................................... 359/785

(58) Field of Classification Search .......... 359/754–758, 359/763, 764, 766, 771–774, 785
See application file for complete search history.

(56) References Cited

U.S. PATENT DOCUMENTS

| | | | | |
|---|---|---|---|---|
| 3,762,801 | A * | 10/1973 | Baker | 359/716 |
| 4,139,267 | A * | 2/1979 | Minoura | 359/779 |
| 4,892,398 | A * | 1/1990 | Kudo et al. | 359/708 |
| 6,724,547 | B2 * | 4/2004 | Sato | 359/785 |
| 6,970,306 | B2 * | 11/2005 | Matsuo | 359/716 |

* cited by examiner

*Primary Examiner* — Darryl J Collins

(74) *Attorney, Agent, or Firm* — McClure, Qualey & Rodack, LLP

(57) ABSTRACT

A scanner lens includes a first lens, a second lens, and a third lens. The first lens is provided with a first focal length. The first, second, and third lenses are sequentially arranged from an object end to an imaging end and are respectively provided with a plus diopter, a minus diopter, and a plus diopter. At least one of the first, second, and third lenses comprises an aspheric lens. The ratio of the first focal length to a system focal length of the scanner lens ranges between 1 and 2.

2 Claims, 7 Drawing Sheets

SCANNER LENS

CROSS REFERENCE TO RELATED APPLICATIONS

This Application claims priority of Taiwan Patent Application No. 98130376, filed on Sep. 9, 2009, the entirety of which is incorporated by reference herein.

BACKGROUND OF THE INVENTION

1. Field of the Invention

The invention relates to an optical device, and more particularly to a scanner lens.

2. Description of the Related Art

Scanners are generally classified into two categories, i.e. list-type and photographic-type scanners. Among the scanner types, the image pickup efficiency of the photographic-type scanners is better than that of the list-type scanners. Referring to FIG. 1, a conventional photographic-type scanner 1 comprises a main body 11, a scanner lens 12, a light source 13, and a plurality of reflective mirrors 15. The scanner lens 12 is disposed in the main body 11. Light from the light source 13 is output to a target 14 which needs to be scanned and is reflected thereby to the reflective mirrors 15 disposed in the main body 11. Then, the image of the target 14 is imaged on the scanner lens 12 by reflection of the reflective mirrors 15. Here, the scanner lens 12 provides a view angle of around 40°. When the view angle of the scanner lens 12 is not large enough (i.e. when the scanner lens 12 is provided with a long focal length), the width and height of the photographic-type scanner 1 are large. Accordingly, to reduce the size of the photographic-type scanner 1, the view angle of the scanner lens 12 must be increased.

Hence, there is a need for a scanner lens with an increased view angle.

BRIEF SUMMARY OF THE INVENTION

A detailed description is given in the following embodiments with reference to the accompanying drawings.

An exemplary embodiment of the invention provides a scanner lens comprising a first lens, a second lens, and a third lens. The first lens is provided with a first focal length $f_1$. The first, second, and third lenses are sequentially arranged from an object end to an imaging end and are respectively provided with a plus diopter, a minus diopter, and a plus diopter. At least one of the first, second, and third lenses comprises an aspheric lens. The ratio of the first focal length $f_1$ to a system focal length f of the scanner lens ranges between 1 and 2 (i.e. $1<f_1/f<2$).

When meeting the requirement of $1<f_1/f<2$, the scanner lens can simultaneously provide superior imaging quality, a large view angle, and a reduced size.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
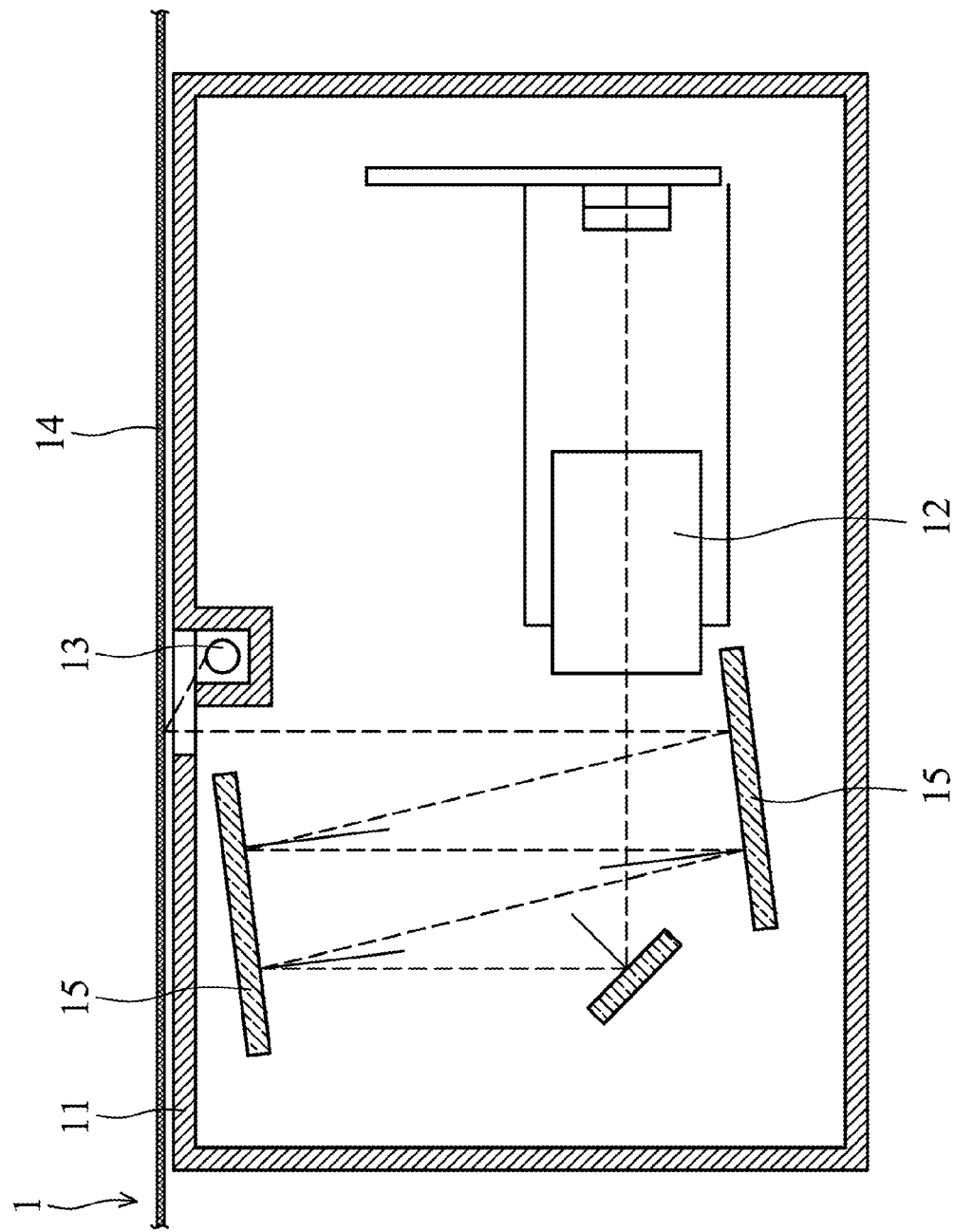
FIG. 1 is a schematic cross section of a conventional photographic-type scanner.
Figure 2:
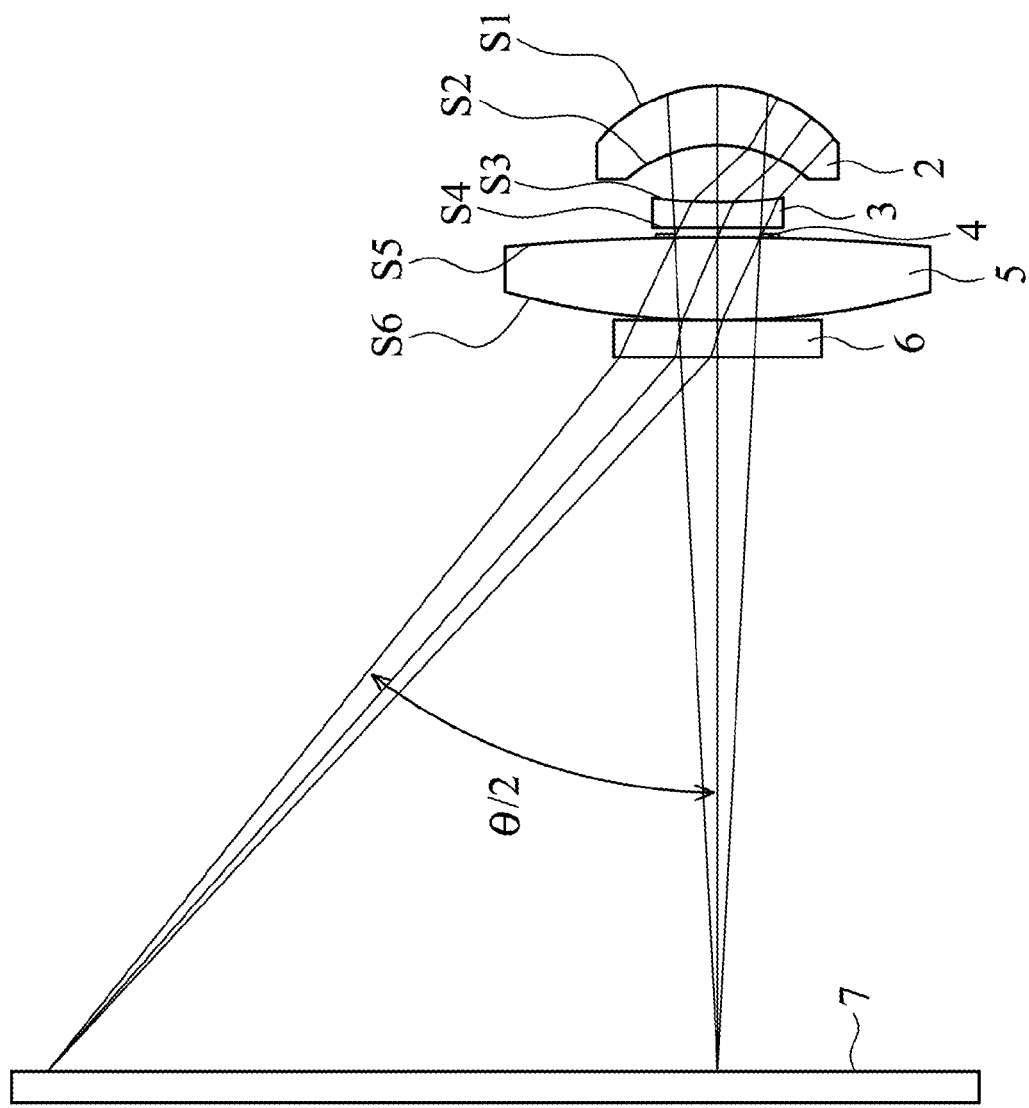
FIG. 2 is a schematic view of a scanner lens of a first embodiment of the invention.

Referring to FIG. 2, a scanner lens comprises a first lens 2, a second lens 3, an aperture stop 4, and a third lens 5 sequentially arranged from an object end to an imaging end. Light beams pass through the scanner lens and a cover glass 6 and are projected on an image sensor 7 (such as a CCD sensor or a CMOS sensor).

The first lens 2, second lens 3, and third lens 5 are respectively provided with a plus diopter, a minus diopter, and a plus diopter. At least one of the first lens 2, second lens 3, and third lens 5 comprises an aspheric lens. In a preferred embodiment, the first lens 2 comprises an aspheric lens, and the first lens 2, second lens 3, third lens 5, and aperture stop 4 are arranged with a view angle θ with a minimum magnitude of 70°.

The first lens 2 comprises an aspheric positive meniscus glass lens, providing main reflection for dominating imaging. The second lens 3 comprises a spherical concave glass lens, such as a biconcave lens or a plane concave lens, eliminating chromatic aberration. The aperture stop 4 is an intermediate stop disposed between the second lens 3 and the third lens 5, increasing the magnitude of the view angle θ. The third lens 5 comprises a spherical biconvex glass lens, correcting aberration.

The scanner lens complies with the following conditional expression:

$$1<f_1/f<2 \qquad (1),$$

wherein $f_1$ denotes a first focal length of the first lens 2 and f denotes a system focal length of the scanner lens. Namely, the ratio of the first focal length $f_1$ to the system focal length f ranges between 1 and 2.

If $f_1/f$ exceeds the upper limit, the first lens 2 provides a weak refractive capability, thereby causing a small view angle and an excessively long optical total length. If $f_1/f$ exceeds the lower limit, the first lens 2 provides an excessively small radius and takes the most refraction, increasing optical sensitivity, and further causing obvious aberration. Thus, when complying with the conditional expression (1), the scanner lens can provide superior imaging quality and a large view angle θ.

The scanner lens complies with the following conditional expression:

$$0.005 < R_1/f_1 < 0.25 \quad (2),$$

wherein $R_1$ denotes a curvature radius of a surface S1, facing the object end, of the first lens 2. If $R_1/f_1$ exceeds the upper limit, the first lens 2 provides an excessively small focal length, thereby causing obvious aberration. If $R_1/f_1$ exceeds the lower limit, the first lens 2 provides an excessively small curvature radius $R_1$ for the surface S1 facing the object end, also causing the obvious aberration.

The aspheric surface of the first lens 2 can be expressed by the following conditional expression:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}, \quad (3)$$

wherein, z denotes a displacement value by which a position at a height h along the direction of an optical axis is separated from the optical axis, k denotes a conic coefficient, c denotes the reciprocal of the curvature radius, A to G denote high-level aspheric coefficients. The aspheric lens can enhance imaging quality. If the first lens 2 is an aspheric lens, a space with a sufficient length is required for disposition of a composite lens for correcting aberration, indirectly increasing the optical total length.

First Embodiment

Table 1-1 shows various parameters of the scanner lens.

TABLE 1-1

| surface number | curvature radius (mm) | thickness (mm) | refractive index $N_d$ | Abbe coefficient $v_d$ |
|---|---|---|---|---|
| S1 | 0.20443 | 0.070506 | 1.739 | 49.04 |
| S2 | 0.208537 | 0.058153 | | |
| S3 | −0.892511 | 0.029834 | 1.755093 | 27.53 |
| S4 | infinity | 0.011042 | | |
| aperture stop | | 0.0008249 | | |
| S5 | 2.231531 | 0.100775 | 1.8349 | 43 |
| S6 | −0.84867 | 0.275833 | | |

S1 and S2 respectively denote the object end surface and imaging end surface of the first lens 2, S3 and S4 respectively denote the object end surface and imaging end surface of the second lens 3, and S5 and S6 respectively denote the object end surface and imaging end surface of the third lens 5. In this embodiment, the second lens 3 is a plane concave lens, the system focal length f is 18.126 mm, the focal length $f_1$ of the first lens 2 is 30.84 mm, and the curvature radius $R_1$ of the first lens 2 is 0.20443 mm. In compliance with the conditional expressions (1) and (2), the magnitude of the view angle θ is 75.3°.

The aspheric coefficients of the first lens 2 are shown in table 1-2.

TABLE 1-2

| Surface number | k | A | B | C | D | E | F | G |
|---|---|---|---|---|---|---|---|---|
| S1 | 0.4668197 | −5.85726 | 211.92768 | −7893.36 | −646271.0 | 52131446 | −1.8688e9 | 1.0191e10 |
| S2 | 1.767592 | −14.7718 | 228.5793 | −106145 | 26519621 | −5.708e9 | 4.654e11 | −1.49e13 |

Figure 3B:
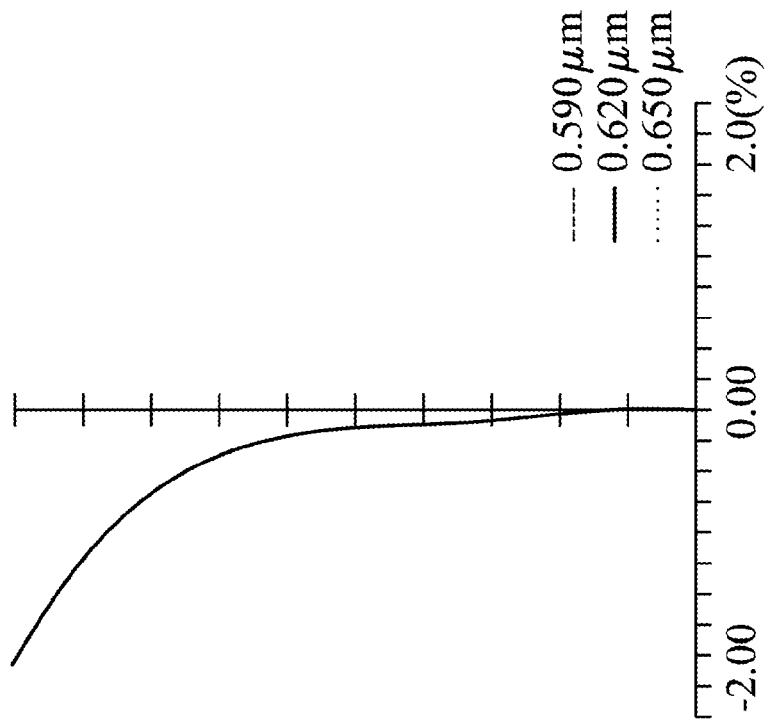
FIG. 3B is a diagram showing distortion of the scanner lens of the first embodiment of the invention.
Figure 3A:
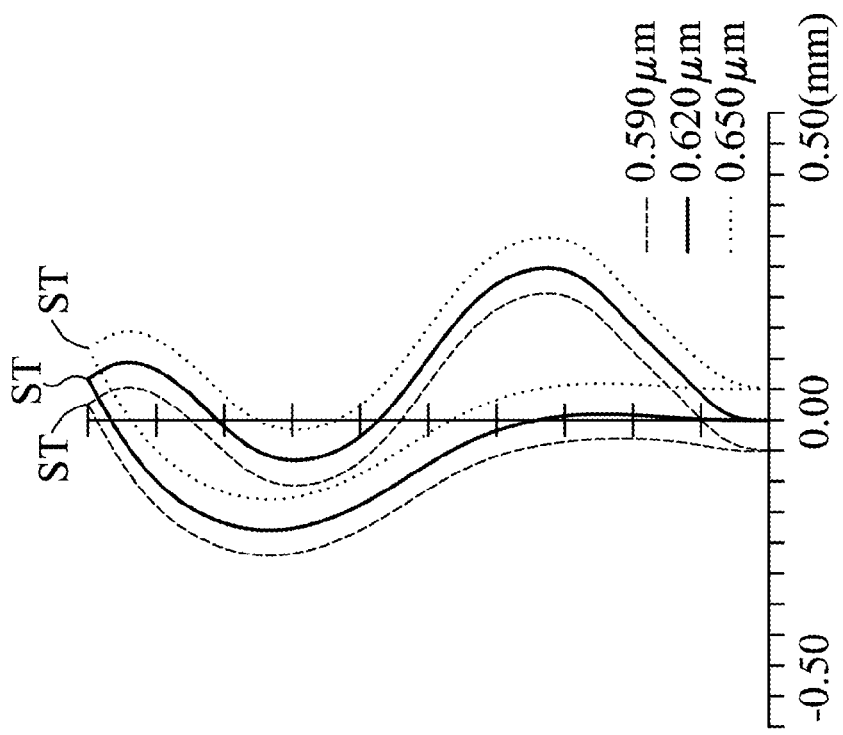
FIG. 3A is a diagram showing field curvature of the scanner lens of the first embodiment of the invention.

FIG. 3A is a diagram of field curvature showing imaging positions at different levels, wherein T denotes a meridianal ray, S denotes a sagittal ray, the X-coordinate shows the distance from an imaging point to an ideal image plane, and the Y-coordinate shows an ideal image height. FIG. 3B is a diagram of distortion showing transverse magnification, wherein the X-coordinate shows difference in percentage from the imaging point to an ideal imaging point, and the Y-coordinate shows the ideal image height. According to FIG. 3A and FIG. 3B, the field curvature and distortion are not serious.

Figure 3C:
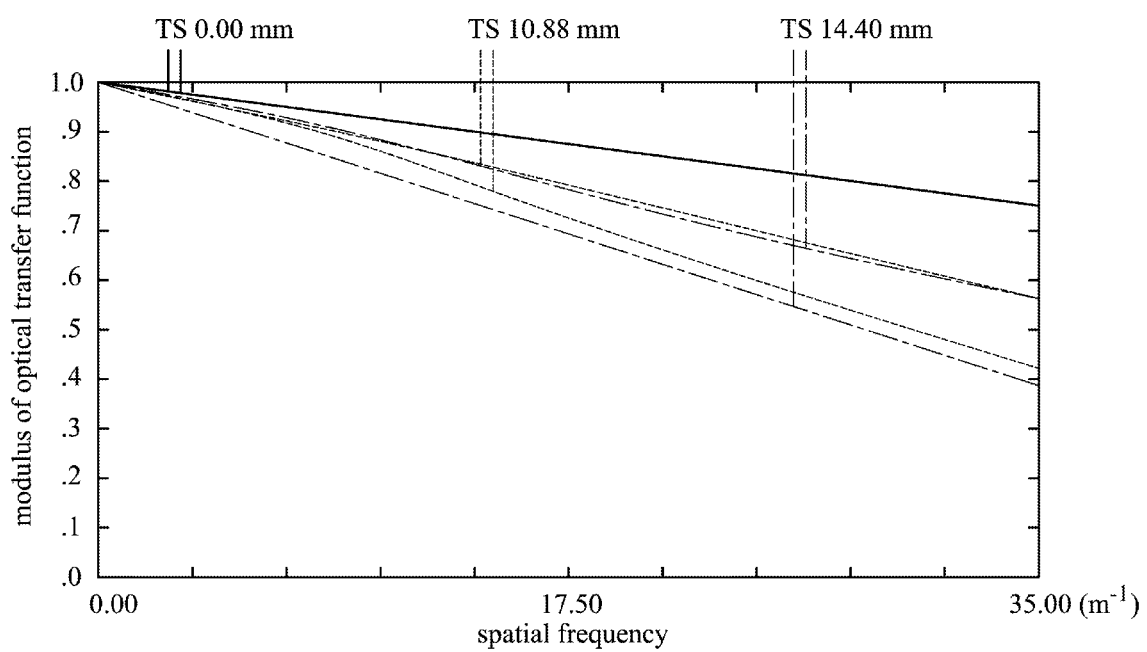
FIG. 3C is a diagram showing an optical transfer function of the scanner lens of the first embodiment of the invention.
Figure 3D:
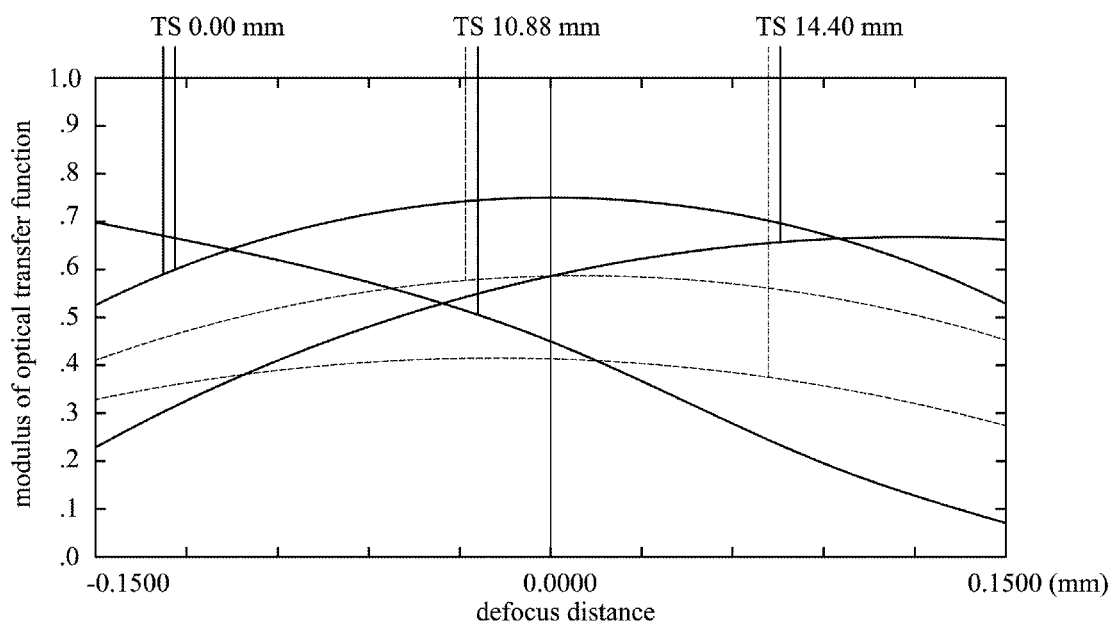
FIG. 3D is a diagram showing a through focus optical transfer function of the scanner lens of the first embodiment of the invention.

FIG. 3C is a diagram of an optical transfer function showing the modulus of the optical transfer function varying with the spatial frequency. FIG. 3D is a diagram of a through focus optical transfer function showing the focus deviation and corresponding modulus of the optical transfer function. According to FIG. 3C and FIG. 3D, a superior optical resolution is provided in this embodiment.

Second Embodiment

Table 2-1 shows various parameters of the scanner lens.

TABLE 2-1

| surface number | curvature radius (mm) | thickness (mm) | refractive index $N_d$ | Abbe coefficient $v_d$ |
|---|---|---|---|---|
| S1 | 0.206446 | 0.071495 | 1.739 | 49.04 |
| S2 | 0.210172 | 0.061836 | | |
| S3 | −0.698664 | 0.027581 | 1.755093 | 27.53 |
| S4 | −1.992341 | 0.011034 | | |
| aperture stop | | 0.0008249 | | |
| S5 | 3.247782 | 0.098328 | 1.8349 | 43 |
| S6 | −0.864111 | 0 | | |

Figure 4:
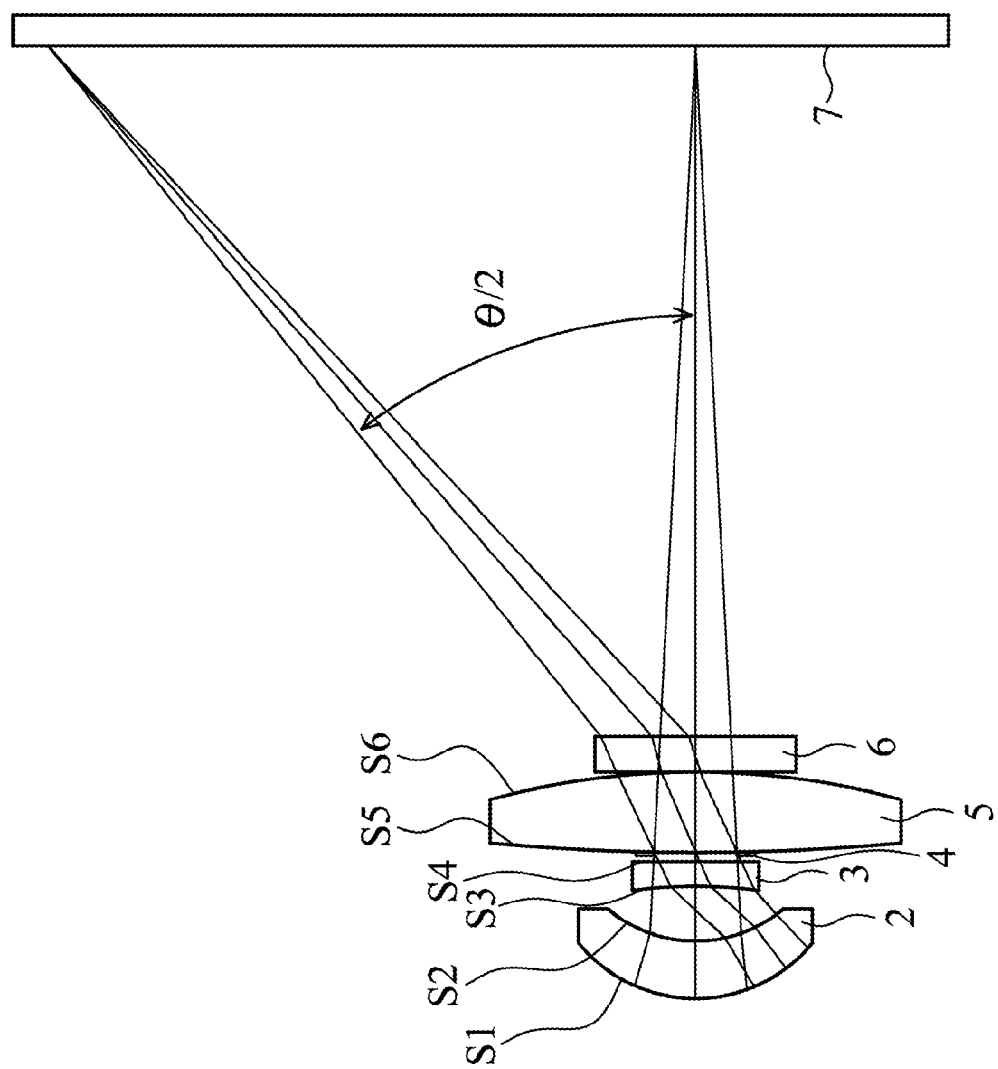
FIG. 4 is a schematic view of a scanner lens of a second embodiment of the invention.
Figure 5:
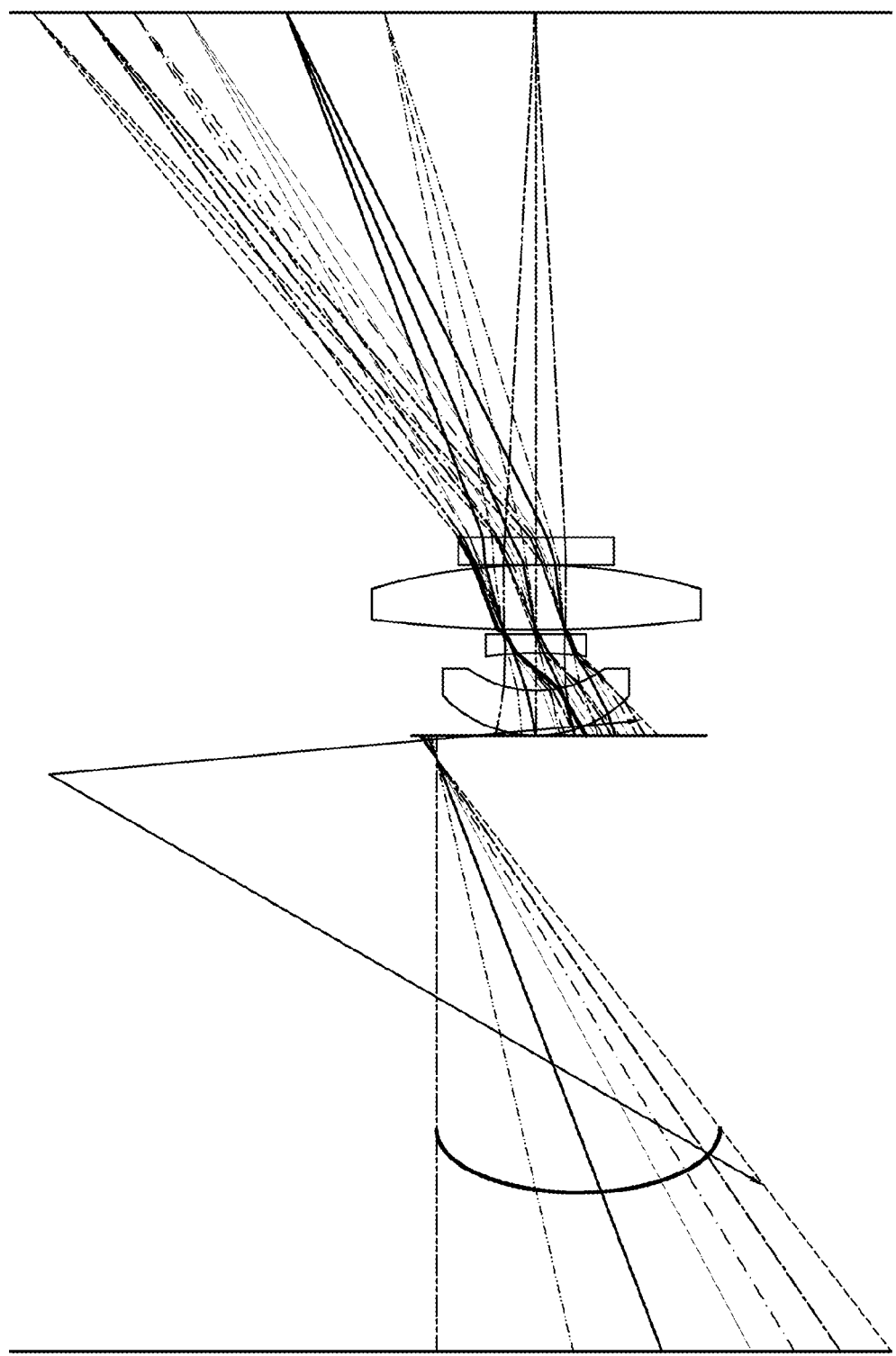
FIG. 5 is a schematic view of a scanner lens of the invention.

Referring to FIG. 4, the second lens 3 is a biconcave lens, the system focal length f is 18.125 mm, the focal length $f_1$ of the first lens 2 is 31.34 mm, and the curvature radius $R_1$ of the first lens 2 is 0.206446 mm. In compliance with the conditional expressions (1) and (2), the magnitude of the view angle θ is 75.3°.

The aspheric coefficients of the first lens 2 are shown in table 2-2.

TABLE 2-2

| Surface number | k | A | B | C | D | E | F | G |
|---|---|---|---|---|---|---|---|---|
| S1 | 0.4702 | −5.809959 | 194.37973 | −15492.30 | 158054.54 | 30500875 | −3.1012e9 | 6.5568e10 |
| S2 | 1.766 | −14.77981 | 181.03806 | −113520.2 | 24353927 | −5.6081e9 | 4.6895e11 | −1.449e13 |

In conclusion, as the magnitude of the view angle $\theta$ of the scanner lens is increased to exceed 75° by the first lens 2 complying with the conditional expressions (1) and (2), the optical total length is reduced, thereby reducing the overall size of the scanner lens or a scanner. Moreover, as the first lens 2 comprises the aspheric lens, the aberration is reduced and the field curvature is corrected.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scanner lens, comprising:
    a first lens provided with a first focal length;
    a second lens;
    a third lens, wherein the first, second, and third lenses are sequentially arranged from an object end to an imaging end and are respectively provided with a plus diopter, a minus diopter, and a plus diopter, the first lens comprises an aspheric lens, a surface, facing the object end, of the first lens is provided with a curvature radius, the ratio of the curvature radius to the first focal length ranges between 0.005 and 0.25, and the ratio of the first focal length to a system focal length of the scanner lens ranges between 1 and 2; and
    an aperture stop disposed between the second and third lenses, wherein the first lens, second lens, third lens, and aperture stop are arranged with a view angle with a minimum of 70°.

2. A scanner lens, comprising:
    a first lens provided with a first focal length;
    a second lens;
    a third lens, wherein the first, second, and third lenses are sequentially arranged from an object end to an imaging end and are respectively provided with a plus diopter, a minus diopter, and a plus diopter, at least one of the first, second, and third lenses comprises an aspheric lens, and the ratio of the first focal length to a system focal length of the scanner lens ranges between 1 and 2; and
    an aperture stop disposed between the second and third lenses, wherein the first lens, second lens, third lens, and aperture stop are arranged with a view angle with a minimum of 70°.

* * * * *